UNITED STATES PATENT OFFICE.

GEORGE T. LEWIS, OF PHILADELPHIA, PENNSYLVANIA.

IMPROVEMENT IN THE MANUFACTURE OF CARBONATE OF LEAD, &c.

Specification forming part of Letters Patent No. 112,608, dated March 14, 1871.

*To all whom it may concern:*

Be it known that I, GEORGE T. LEWIS, of the city and county of Philadelphia, in the State of Pennsylvania, have invented a new and useful process of treating sulphate of lead with alkaline carbonates for the purpose of obtaining carbonate of lead; and I do hereby declare the following to be a full, clear, and exact description thereof.

My invention consists in the conversion of sulphate of lead into carbonate through the intervention of carbonate of soda (whether in the form of soda-ash or carbonate of soda or sal-soda, or any other of its commercial forms) or the other alkaline soluble carbonates chemically equivalent to carbonate of soda. To effect this change, I treat in the following manner the sulphate of lead, which is now a refuse product in certain technical operations, or which may be readily or easily produced directly from the native sulphuret of lead, also from the ores of lead and zinc combined, through a proper process of oxidizing, roasting, and burning. A strong solution of carbonate of soda, with, say, at about 16° Baumé's hydrometer, which will be equivalent to ten per cent. of anhydrous or dry carbonate, is added to the sulphate of lead in such amounts that for each atom of the sulphate of lead there shall be represented in the solution an atom of the soluble carbonate of soda. This mixture is placed in a closed iron vessel capable of resisting the necessary pressure, and supplied with a pressure-gage. Heat is then applied until a pressure of, say, twenty-five pounds to the square inch is attained within the boiler. An interchange of acids and bases is effected with the production of carbonate of lead and sulphate of soda. The increased pressure has the double effect of increasing the activity of the chemical change while at the same time the resulting carbonate of lead is rendered more dense, and will be therefore better adapted for employment as a pigment, since it has better covering properties. The product, which is a mixture of sulphate of soda with the carbonate of lead, is shown in a filter of suitable material, and is well washed. The sulphate of lead is drawn off, leaving the carbonate of lead, which, after drying, is adapted for grinding in oil. If the sulphate of lead contains oxide of the same metal mixed with it, which is not uncommon when the sulphate resulting from the oxidizing roastings of galena or native sulphuret of lead is employed, the resulting carbonate also contains oxide and approaches very closely in composition to the white lead produced by the ordinary or Dutch method, the oxide becoming hydrated under the increased pressure.

Instead of carbonate of soda, bicarbonate of soda or the carbonates of potash or ammonia or other soluble carbonate might be used, although their cost would render them inferior to the carbonates of soda.

I do not limit myself to any special degree of pressure, but have expressed one which I find in practice gives a good result.

What I claim as my invention, and desire to secure by Letters Patent of the United States, is—

1. The manufacture of carbonate of lead or white lead directly from the sulphate of lead through the agency of the soluble carbonates heated under pressure.

2. As a new article of manufacture, carbonate of lead produced by treating sulphate of lead with soluble carbonates heated under pressure as the basis of a pigment or as a material to be used in the manufacture of acetates and other commercial salts of lead or orange mineral or other commercial oxides of lead.

GEORGE T. LEWIS.

Witnesses:
 WM. R. WRIGHT,
 THOS. A. BURTT.